United States Patent Office 2,841,222
Patented July 1, 1958

2,841,222
WELL TREATING PROCESS

Gerould H. Smith, Santa Ana, Calif., assignor to Union Oil Company of California, Los Angeles, Calif., a corporation of California No Drawing. Application October 8, 1956
Serial No. 614,382

12 Claims. (Cl. 166—42)

This invention relates to the chemical treatment of strata penetrated by a well bore in order to improve the fluid flow properties thereof and in particular relates to a process for flocculating argillaceous or clayey constituents present in fluid-containing permeable underground formations.

In the rotary drilling of a well bore into the earth a long drill pipe or drill stem is extended downwardly through a rotary table, by means of which the drill stem is turned, and through the bore hole at the end of which a drill bit is pressed against the working face of the bore. In order to cool and lubricate the bit a drilling fluid is pumped downwardly through the drill stem, through the bit and across the working face, and upwardly through the space surrounding the drill bit in the bore hole. In these bores the hydrostatic pressure of this fluid becomes rather high and at least a small amount of the liquid portion of the drilling fluid is forced by this hydrostatic pressure to flow as a filtrate into permeable underground strata penetrated by the bore. Since most permeable strata underground are saturated with an indigenous interstitial fluid, the filtrate from the drilling fluid displaces at least part of the interstitial liquid through the strata away from the well bore. The filter loss, or the amount of drilling fluid which does invade the drilling formations, is desirably low because of several disadvantageous effects which the filtrate has on the formation. In the case of an aqueous filtrate, gellation and swelling of certain argillaceous constituents found in many permeable strata result decreasing the fluid permeability of the stratum, and this in turn results in a relatively low production rate from the bore. In subsequent electric well logging, the interpretation of the data obtained is based upon an estimated resistivity of the invaded formation. Any drilling fluid filtrate invasion displaces the indigenous fluids and changes the original resistivity to some unknown new value. This is frequently assumed to be the resistivity of the invasion fluid where filtration loss has progressed to a substantial degree.

It has been found that where the permeable strata penetrated by the well bore contain argillaceous materials, and this is typical of the permeable formations in California oil fields and some others, a fresh water filtrate from the drilling fluid which is assumed to exist in the formation after drilling of the well actually becomes salty due to the fact that certain of the clays liberate salt into the new invasion fluid. In so doing the resistivity of the fluid present in the permeable strata is neither as fresh as the original invasion fluid nor necessarily as salty as the original interstitial water. Furthermore, the fresh filtrate can damage the formation through a permeability decrease caused by gellation and swelling of the argillaceous materials.

The present invention is directed to an improved process which successfully overcomes these problems.

The object of the present invention is to provide an improved method for treating permeable underground formations penetrated by a well bore prior to placing the well in operation.

A specific object of this invention is to pretreat the permeable formation with an invasion fluid which effectively flocculates base exchange clays present therein so as to prevent the normal adverse effects on the formation of the invasion fluids.

It is a more specific object of this invention to pretreat argillaceous materials of the base exchange types which exist in permeable underground formations penetrated by a bore hole with a complex prepared from an alkaline earth metal halide and specific forms of non-ionic surfactants in order to carry the surfactant a considerable distance from the well bore into the formation at which point it is sorbed by and flocculates base exchange clays so as to decrease the abnormal conductivities caused by the retention of interstitial water by the swollen clay and which adversely effect electric logs and maintain high fluid permeabilities.

Other objects and advantages of the present invention will become more apparent to those skilled in the art as the description and illustration thereof proceed.

Briefly the present invention comprises treating permeable formations penetrated by a well bore with an aqueous solution containing a non-ionic surfactant-alkaline earth metal halide complex which decomposes and the liberated surfactant sorbs on the argillaceous or clayey constituents present in certain of these strata. The treatment flocculates the swelled clays and prevents further clay swelling and gel formation which interfere with the normal fluid flow into or out of the permeable strata.

Many of the oil bearing formations present in California and certain other formations are characterized by the presence of such argillaceous materials which exhibit base exchange properties and which are in contact with saline interstitial waters. During drilling the drilling fluid filtrate invades the permeable zone, displaces the interstitial water out ahead of it, causes gellation and swelling of the argillaceous materials producing a substantial decrease in fluid permeability, and the invasion fluid changes in salinity due to the base exchange properties of the clays present.

It has now been found that certain non-ionic detergents or surfactants are selectively and highly sorbed by the base exchange types of clays and that in the sorption of these materials the clay is completely flocculated. This neutralizes or destroys the swelling properties and converts the clay to a non-gelling, non-swelling material having a granular structure of high fluid permeability.

A particular desirable improvement according to this invention is to incorporate the surfactant in an invasion fluid in the form of an association complex with an alkaline earth metal halide such as calcium chloride, magnesium chloride, and the corresponding bromides. It has been found that these halides effectively "salt in" the surfactant material into the solution protecting it against the normal "salting out" effect of the sodium chloride and other soluble salts indigenous to the formation water in oil-bearing strata, and the sorption forces exerted by the clays. This aqueous solution of the complex, is introduced into the well bore and passed under pressure against the face of the permeable stratum so as to flow into it and radially away from the well bore axis. As the invasion continues, the saline formation water is gradually mixed with the invasion fluid. The progressive dilution continues until the complex decomposes and the liberated surfactant is only then rapidly adsorbed by argillaceous materials therein which exhibit base exchange properties. The divalent metal ion salt also has favorable flocculating effects on the clays. The concentration of the complex in the original invasion fluid is controlled with respect to the salinity of the normal interstitial water and also with respect to the temperature of the formation so that the decomposition of the complex occurs only at depths ranging radially away from the bore hole wall from about 0.1 to 2.0 feet into the penetrated formation.

The non-ionic surfactants preferred in the present invention are of the ester type having the general formula

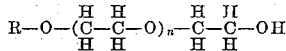

in which $n$ is an integral number ranging from 3 to 30 and R is an organic radical selected from the group consisting of alkylated aryl (alkaryl), fatty acid and mixed acid residues, and the partial esters of hexatyl anhydride and a fatty acid.

Examples of alkyl-aryl radicals include methyl phenyl, ethyl phenyl, isopropyl phenyl, iso-octyl phenyl, dodecyl phenyl, cetyl phenyl, eicosyl phenyl, and the like.

Examples of the fatty acids are capric, lauric, myristic, palmitic, stearic, oleic, erucic, behenic, and the like. The mixed acids include these same acids and such as abietic acid, tall oil acids, and the like.

Examples of the partial esters are those prepared from the aforementioned fatty acids and a hexatyl anhydride or dehydrated hexitol such as sorbitol, mannitol, dulcitol, iditol, and the like.

The principal preferred form of the non-ionic surfactant employed in the present invention is that in which R is an isooctyl phenyl radical and in which $n$ is about 14.

The procedure involved in the preparation of the aqueous complex, according to this invention and using the preferred surfactants defined above, involves the addition of calcium chloride as the preferred alkaline earth metal halide, either in solid form or in aqueous solution, to a solution containing the dissolved surfactant. The quantities of materials so mixed together is controlled in the ratio of from about 1.0 to about 3.0 moles of calcium chloride per mole of the particular surfactant. With the preferred surfactants indicated above, a micellar complex forms. The final concentration of the surfactant in the aqueous solution thereof is controlled at values between about 1000 and about 100,000 p. p. m. (parts per million). Within this concentration range and at the temperatures existing in the formations, varying between about 100° F. and about 250° F. at present drilling depths, the complex will begin to decompose into its two components and the liberated surfactant begins to sorb on the clays after dilution with sodium chloride brine has proceeded to an extent of about 0.4 mol of NaCl per liter. Greater concentrations of sodium chloride will increase the tendency of the complex to decompose. The usual interstitial water present in oil-bearing formations usually contains on the order of 26,000 parts per million of sodium chloride and this initiates complex decomposition and sorption on the clay. It may be efficacious in instances where NaCl content of a particular brine is low to follow the surfactant complex solution into the formation with a slug of sodium chloride solution containing at least 10% of NaCl. Thus the extent of penetration of the aqueous complex into the permeable strata from the bore hole depends on the concentration of the complex in the surfactant solution and the conditions of salinity. This process of treating with the complex permits very effective treatment of argillaceous permeable formations relatively remote from the well bore axis.

A particularly desirable form of the present invention is the use of the complex as an invasion fluid in conjunction with and following the invasion of the permeable formations by an aqueous solution of between 0.1% and about 10.0% of the preferred surfactant alone. This material is rapidly sorbed on the argillaceous constituents present in the immediate vicinity of the bore hole. By employing the surfactant solution first followed by the surfactant complex solution, a substantially complete elimination of gellation and swelling of argillaceous materials and the associated permeability decrease can be realized. Significantly the total quantity of invasion fluid required when using the two different solutions is approximately 40% of that required using the surfactant solution alone.

A well bore in Southern California was drilled to a depth of about 4500 feet. The penetrated stratum having a thickness of about 47 feet, was first contacted with 3 barrels of alkyl-aryl surfactant preferred in this invention having a concentration of about 0.2% by weight, and this fluid was followed by 4.5 barrels of a 0.3% by weight aqueous solution of the same surfactant complexed with calcium chloride. The entire material was pumped into the well and therefrom into the penetrated permeable strata. The well bore treated in this manner was drilled into the same formation as an adjacent well which had been completed using a conventional water base clay containing drilling fluid. In the case of the earlier bore the production rate was 55 barrels per day. In the case of the well bore treated according to the present invention the production rate was 174 barrels per day. From core samples taken during the drilling through this formation it was determined that the permeable sand contained substantial quantities of montmorillonite as the base exchange clay.

An aqueous soltuion containing 0.15% by weight of a complex of 2 mols of magnesium chloride per mol of surfactant in which R was polyethylene oxide sorbitan mono oleate effectively increased permeability in a water invaded argillaceous California sandstone core from 16 millidarcys to 135 millidarcys.

The corresponding bromide complex appeared to be about as effective.

An aqueous solution containing 0.25% by weight of a complex of 1.5 mols of calcium bromide per mol of the surfactant in which R was a capric acid radical increased the permeability of another water invaded California sandstone core from 35 to 215 millidarcys.

It is thus apparent that the practice of the present invention in the completion of well bores into permeable strata containing argillaceous materials effects a very substantial increase in the productivity of the bore.

A particular embodiment of the present invention has been hereinabove described in considerable detail by way of illustration. It should be understood that various other modifications and adaptations thereof may be made by those skilled in this particular art without departing from the spirit and scope of the invention as set forth in the appended claims.

I claim:

1. A process for treating subterranean permeable formations containing argillaceous materials and penetrated by a bore hole which comprises introducing through said bore hole into said permeable formation an aqueous solution of an alkaline earth metal halide complex with a non-ionic surfactant having the empirical formula

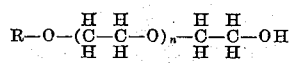

wherein $n$ is an integral number between about 3 and about 20 and R is an organic radical selected from the group consisting of alkyl-aryl, fatty acid and mixed acid residues, and partial esters of hexatyl anhydride and a fatty acid, whereby said surfactant is sorbed by said argillaceous materials thereby flocculating said materials.

2. A process according to claim 1 wherein said alkaline earth metal halide is selected from the group consisting of calcium and magnesium chlorides and bromides.

3. A process according to claim 1 wherein said aqueous solution contains between about 1000 and about 100,000 parts per million of said surfactant.

4. A process according to claim 1 wherein said complex contains between about 1 and about 3 mols of alkaline earth metal halide per mol of surfactant.

5. A process according to claim 1 in combination with the step of introducing through said borehole into said permeable formation an aqueous solution of sodium chloride containing at least about 10% by weight NaCl to assist the decomposition of said complex in said formation and sorption of liberated surfactant by said argillaceous materials.

6. A process according to claim 1 in combination with the step of introducing into said permeable formation, prior to the introduction of the complex solution thereinto, an aqueous solution of said surfactant alone whereby argillaceous materials adjacent the borehole sorb said surfactant and are flocculated.

7. A process according to claim 1 wherein said surfactant comprises

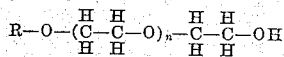

in which R is an iso-octyl phenyl radical, $n$ is 14, and said alkaline earth metal halide is calcium chloride.

8. A process for reducing clay gellation and swelling and increasing fluid permeability of permeable underground argillaceous formations penetrated by a borehole which comprises first flowing into said formation an aqueous solution containing between about 0.1% and about 10.0% by weight of a surfactant having the structural formula

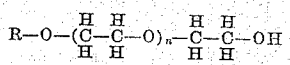

wherein $n$ is an integral number between about 3 and about 20 and R is an organic radical selected from the group consisting of alkyl-aryl, fatty acid and mixed acid residues, and partial esters of hexatyl anhydride and a fatty acid, whereby the formation immediately adjacent the borehole is treated, then flowing into the thus treated formation an aqueous solution containing between about 0.1% and about 10.0% by weight of said surfactant complexed with between about 1 and about 3 mols of an alkaline earth metal halide, selected from the group consisting of the calcium and magnesium chlorides and bromides, per mol of surfactant whereby said complex flows radially from said borehole through the previously treated portion of said formation into previously untreated portions thereof, is decomposed by sodium chloride brine, and the liberated surfactant is sorbed by and treats said previously untreated portions.

9. A process according to claim 8 wherein said sodium chloride brine is indigenous to said formation in the form of interstitial brine.

10. A process according to claim 8 in combination with the step of flowing a sodium chloride brine solution into said permeable formation after introduction of said complex to assist in the decomposition thereof.

11. A process for reducing clay gellation and swelling and increasing fluid permeability of permeable underground argillaceous formations penetrated by a borehole which comprises first flowing into said formation an aqueous solution containing between about 0.1% and about 10.0% by weight of a surfactant-alkaline earth metal halide complex, said surfactant having the structural formula

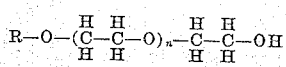

wherein $n$ is an integral number between about 3 and about 20 and R is an organic radical selected from the group consisting of alkyl-aryl, fatty acid and mixed acid residues, and partial esters of hexatyl anhydride and a fatty acid, whereby said complex is decomposed by sodium chloride brine in said formation liberating said surfactant which is sorbed by said argillaceous materials.

12. A process according to claim 11 wherein said alkaline earth metal halide is selected from the group consisting of calcium and magnesium chlorides and bromides.

References Cited in the file of this patent
UNITED STATES PATENTS

| | | |
|---|---|---|
| 2,606,151 | Fischer et al. | Aug. 5, 1952 |
| 2,661,334 | Lummus | Dec. 1, 1953 |